United States Patent
Kim et al.

(10) Patent No.: US 10,694,464 B2
(45) Date of Patent: Jun. 23, 2020

(54) METHOD FOR REDUCING POWER CONSUMPTION THROUGH RANDOM ACCESS RESOURCE INDICATOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/320,449

(22) PCT Filed: Aug. 30, 2017

(86) PCT No.: PCT/KR2017/009457
§ 371 (c)(1),
(2) Date: Jan. 24, 2019

(87) PCT Pub. No.: WO2018/044056
PCT Pub. Date: Mar. 8, 2018

(65) Prior Publication Data
US 2019/0268850 A1    Aug. 29, 2019

Related U.S. Application Data

(60) Provisional application No. 62/408,835, filed on Oct. 17, 2016, provisional application No. 62/381,586, filed on Aug. 31, 2016.

(51) Int. Cl.
*H04W 52/02* (2009.01)
*H04W 74/08* (2009.01)
(Continued)

(52) U.S. Cl.
CPC ....... *H04W 52/0229* (2013.01); *H04W 52/02* (2013.01); *H04W 74/08* (2013.01);
(Continued)

(58) Field of Classification Search
CPC . H04W 52/02; H04W 52/0229; H04W 74/08; H04W 74/0833; H04W 84/12;
(Continued)

(56) References Cited

U.S. PATENT DOCUMENTS

2015/0110071 A1* 4/2015 Jo ............... H04W 36/0072
370/331
2015/0327265 A1* 11/2015 Lee ............... H04W 72/082
370/311
(Continued)

FOREIGN PATENT DOCUMENTS

KR  1020150046527  4/2015
WO  2014084665  6/2014
(Continued)

OTHER PUBLICATIONS

PCT International Application No. PCT/KR2017/009457, Written Opinion of the International Searching Authority dated Dec. 8, 2017, 18 pages.
(Continued)

*Primary Examiner* — Kashif Siddiqui
(74) *Attorney, Agent, or Firm* — Lee, Hong, Degerman, Kang & Waimey PC

(57) ABSTRACT

Disclosed is a method for reducing power consumption by a station (STA) in a mobile communication system. When a trigger frame including a common information field and a user information field is received from an access point (AP), the user information field indicates different information in the case where an association ID (AID) subfield of the user information field has a first value indicating resource allocation for random access and in the case where the AID subfield of the user information field has a value other than the first value. In addition, when the AID subfield has the first value, the user information field includes information indicating whether a resource for random access is allocated,
(Continued)

and the STA may transition to a doze state on the basis of the information indicating whether a resource for random access is allocated.

15 Claims, 13 Drawing Sheets

(51) Int. Cl.
*H04W 84/12* (2009.01)
*H04W 88/02* (2009.01)

(52) U.S. Cl.
CPC ........ *H04W 74/0833* (2013.01); *H04W 84/12* (2013.01); *H04W 88/02* (2013.01); *Y02D 70/00* (2018.01); *Y02D 70/10* (2018.01); *Y02D 70/14* (2018.01)

(58) Field of Classification Search
CPC ....... H04W 88/02; Y02D 70/00; Y02D 70/10; Y02D 70/14
See application file for complete search history.

(56) References Cited

U.S. PATENT DOCUMENTS

| | | | | |
|---|---|---|---|---|
| 2016/0183161 | A1* | 6/2016 | Jeong | H04W 8/26 370/315 |
| 2017/0111096 | A1* | 4/2017 | Nabetani | H04B 7/0617 |
| 2017/0325178 | A1* | 11/2017 | Verma | H04W 52/243 |
| 2018/0115947 | A1* | 4/2018 | Kim | H04W 52/0216 |
| 2018/0176865 | A1* | 6/2018 | Kim | H04W 52/0229 |
| 2019/0364577 | A1* | 11/2019 | Hedayat | H04L 27/2607 |

FOREIGN PATENT DOCUMENTS

| | | |
|---|---|---|
| WO | 2015023103 | 2/2015 |
| WO | 2016028131 | 2/2016 |

OTHER PUBLICATIONS

Shih, C. et al., "Scheduled WiFi using distributed contention in WLANs: algorithms, experiments, and case-studies", Springer Link, Georgia Institute of Technology, Jun. 2016, pp. 1-24, 26 pages.

European Patent Office Application Serial No. 17846981.3, Search Report dated Mar. 30, 2020, 5 pages.

IEEE P802.11axTm/D0.4; Draft Standard for Information technology—Telecommunications and information exchange between systems Local and metropolitan area networks—Specific requirements, Part 11: Wireless LAN Medium Access Control (MAC) and Physical Layer (PHY) Specifications; Amendment 6: Enhancements for High Efficiency WLAN (#1121), Aug. 2016, 318 pages.

\* cited by examiner

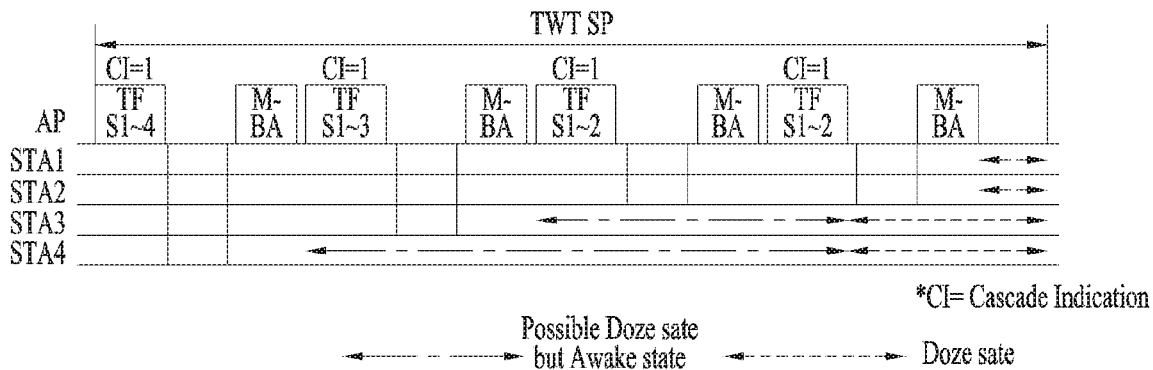

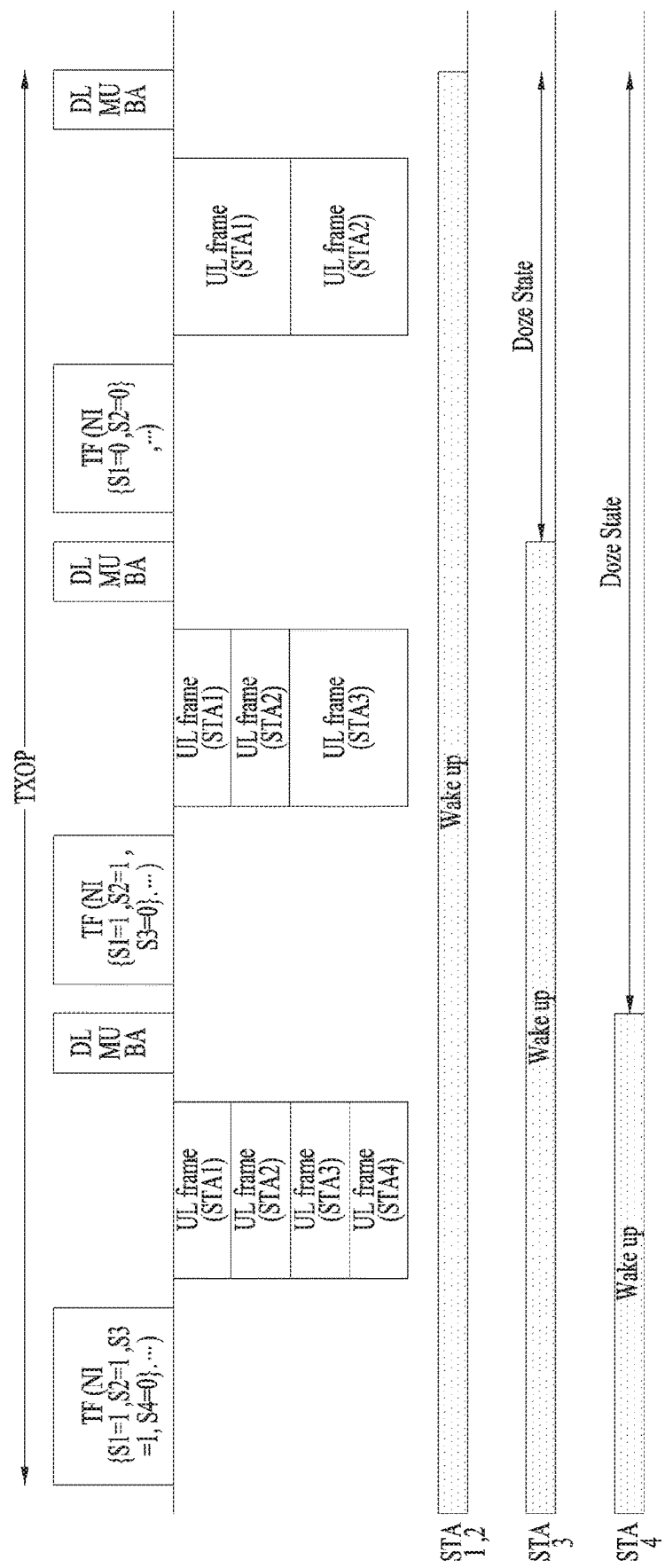

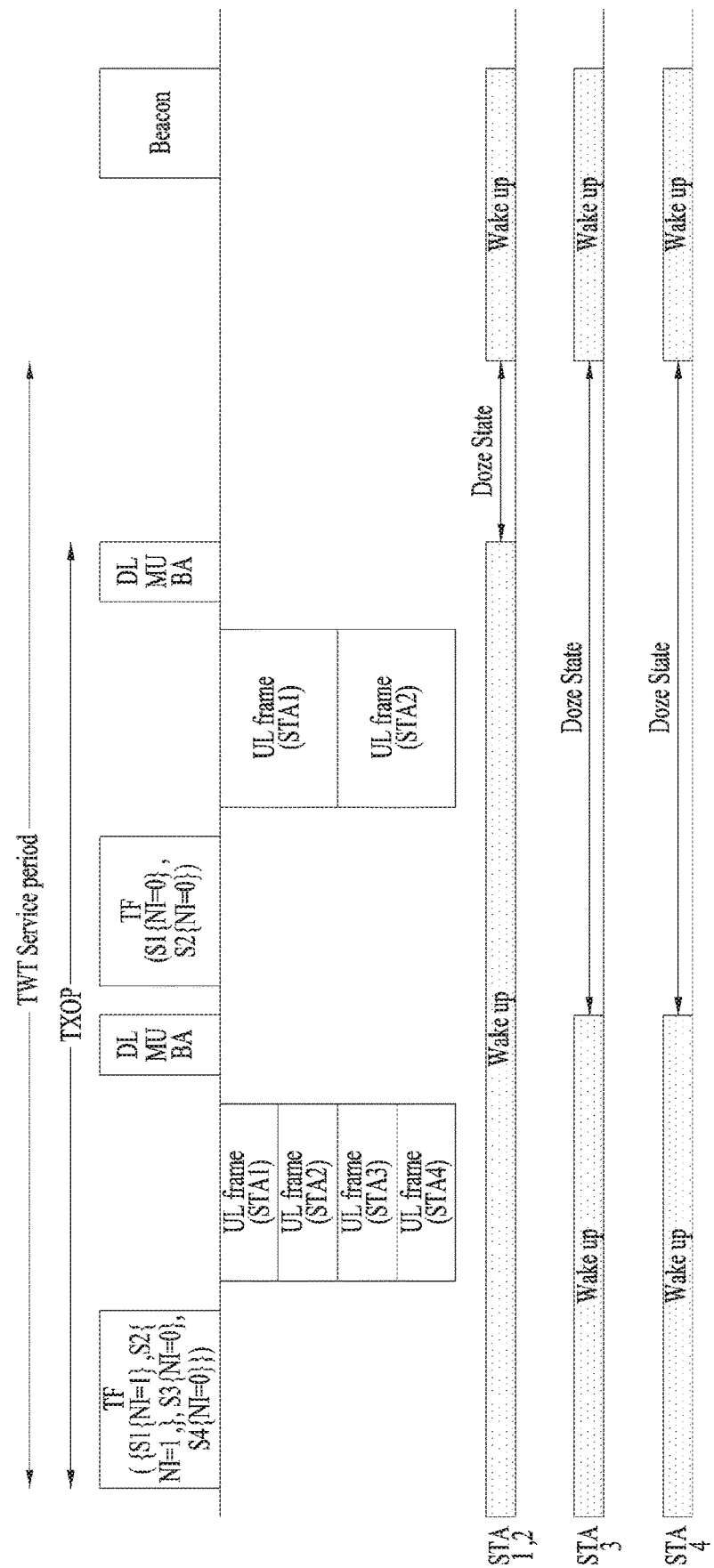

FIG. 14

| B0  B11 | B12  B19 | B20 | B21  B24 | B25 | B26  B31 | B32  B38 | B39 | |
|---|---|---|---|---|---|---|---|---|
| ADL12 | RU Allocation | Coding Type | MCS | DCM | SS Allocation | Target RSSI | Reserved | Trigger Dependent User Info |
| Bits: 12 | 8 | 1 | 4 | 1 | 8 | 7 | 1 | variable |

FIG. 15

| B26 | B28 | B29 | B31 |
|---|---|---|---|
| Starting Spatial Stream | | Number Of Spatial Streams | |
| Bits: 3 | | 3 | |

METHOD FOR REDUCING POWER CONSUMPTION THROUGH RANDOM ACCESS RESOURCE INDICATOR

CROSS-REFERENCE TO RELATED APPLICATIONS

This application is the National Stage filing under 35 U.S.C. 371 of International Application No. PCT/KR2017/009457, filed on Aug. 30, 2017, which claims the benefit of U.S. Provisional Application No. 62/381,586, filed on Aug. 31, 2016, and 62/408,835, filed on Oct. 17, 2016, the contents of which are all hereby incorporated by reference herein in their entirety.

TECHNICAL FIELD

The present disclosure relates to a Wireless Local Area Network (WLAN) system, and more particularly, to a method and apparatus for reducing power consumption by a Station (STA) that performs random access in a WLAN system.

BACKGROUND ART

While the proposed power saving method can be applied to various wireless communication systems, the WLAN system is described as an example of the system to which the present invention can be applied.

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

IEEE 802.11ax supports not only a downlink multi-user access scheme but also an uplink multi-user access scheme to improve the system performance According to the uplink multi-user access scheme, an STA(s) can receive allocation of uplink resources by receiving a trigger frame from an Access Point (AP) and transmit a UL MU data frame based on the allocated uplink resources. Upon receiving the trigger frame, the STA(s) checks whether there is a subsequent trigger frame based on Cascade Indicator (CI) information in the trigger frame. If there is no subsequent trigger frame, the STA(s) can transition to and maintain a doze state until the next transmission opportunity (TXOP) or Target Wake Time (TWT).

However, since such CI-based Power Saving (PS) is common information for all STAs that participates in the multi-user transmission, it has limitations in terms of efficiency.

In the following description, a method for improving the PS efficiency by providing subsequent scheduling information per user as well as minimizing the signaling overhead will be explained.

Moreover, in the current WLAN technology, it is difficult for random access STAs to efficiently reduce power consumption in a situation in which random access STAs co-exist with scheduling-based STAs.

Therefore, the following description is intended to propose a trigger frame structure for efficiently reducing of power consumption of a random access STA, and a Station/Access Point (STA/AP) based on the trigger frame structure.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention devised to solve the conventional problem, a method of reducing power consumption by a station (STA) in a wireless local area (WLAN) system includes receiving, from an access point (AP), a trigger frame including a common information field and a user information field, the user information field indicating different information when an association identifier (AID) subfield of the user information field is set to a first value indicating resource allocation for random access, and when the AID subfield of the user information field is set to a value other than the first value, and transmitting a physical protocol data unit (PPDU) to the AP in response to the trigger frame. If the AID subfield is set to the first value, the user information field includes information indicating whether resources are allocated for random access, and the STA transitions to a doze state on the basis of the information indicating whether resources are allocated for random access.

If the AID subfield is set to a value other than the first value, the user information field may include a spatial stream (SS) allocation subfield indicating information about an SS of the PPDU transmitted in response to the trigger frame, a modulation and coding scheme (MCS) subfield indicating an MCS to be applied to the PPDU, and a target received signal strength indicator (RSSI) subfield indicating a target RSSI for the PPDU.

If the AID subfield is set to the first value, the user information field may include a subfield indicating the information indicating whether resources are allocated for random access in a position corresponding to the SS allocation subfield, the MCS subfield, and the target RSSI subfield.

If the STA is performing random access, and the information indicating whether resources are allocated for random access is set to a first value, the STA may transition to and maintains the doze state for a predetermined time period.

The predetermined time period may be configured as one of a scheduling period based on the trigger frame, a target wake time (TWT) service period from the trigger frame, and a period from the trigger frame to the end of a transmission opportunity (TXOP).

If the STA transmits uplink data in a multi-user scheme, and the AID subfield is set to a value other than the first value, the STA may transmit a trigger-based PPDU (TB PPDU) to the AP on the basis of information of the user information field.

The first value may be 0 or 2045.

In another aspect of the present invention, an STA configured to reduce power consumption in a WLAN system includes a transceiver configured to receive, from an AP, a trigger frame including a common information field and a user information field, and transmit a PPDU to the AP in response to the trigger frame, and a processor configured to control the transceiver to transmit the PPDU by processing the trigger frame. When an AID subfield of the user information field is set to a first value indicating resource allocation for random access, and when the AID subfield of the user information field is set to a value other than the first value, the user information field indicates different information. If the AID subfield is set to the first value, the user information field includes information indicating whether resources are allocated for random access, and the processor transitions the STA to a doze state on the basis of the information indicating whether resources are allocated for random access.

If the AID subfield is set to a value other than the first value, the user information field may include an SS allocation subfield indicating information about an SS of the PPDU transmitted in response to the trigger frame, an MCS subfield indicating an MCS to be applied to the PPDU, and a target RSSI subfield indicating a target RSSI for the PPDU.

If the AID subfield is set to the first value, the user information field may include a subfield indicating the information indicating whether resources are allocated for random access in a position corresponding to the SS allocation subfield, the MCS subfield, and the target RSSI subfield.

If the STA is performing random access, and the information indicating whether resources are allocated for random access is set to a first value, the processor may be configured to control the STA to transition to and maintain the doze state for a predetermined time period.

The predetermined time period may be configured as one of a scheduling period based on the trigger frame, a TWT service period from the trigger frame, and a period from the trigger frame to the end of a TXOP.

If the STA transmits uplink data in a multi-user scheme, and the AID subfield is set to a value other than the first value, the processor may be configured to transmit a trigger-based PPDU (TB PPDU) to the AP on the basis of information of the user information field through the transceiver.

In another aspect of the present invention, a method of reducing power consumption of an STA in a WLAN system includes transmitting a trigger frame including a common information field and a user information field to one or more STAs by an AP, the user information field indicating different information when an AID subfield of the user information field is set to a first value indicating resource allocation for random access, and when the AID subfield of the user information field is set to a value other than the first value, and receiving a PPDU from the one or more STAs in response to the trigger frame. If the AID subfield is set to the first value, the user information field includes information indicating whether resources are allocated for random access, whereby allowing the one or more STAs to transition to a doze state on the basis of the information indicating whether resources are allocated for random access.

In another aspect of the present invention, an AP for reducing power consumption of an STA in a WLAN system includes a transceiver configured to transmit a trigger frame including a common information field and a user information field to one or more STAs, and receive a PPDU from the one or more STAs in response to the trigger frame, and a processor connected to the transceiver and configured to provide the trigger frame. When an AID subfield of the user information field is set to a first value indicating resource allocation for random access, and when the AID subfield of the user information field is set to a value other than the first value, the processor is configured to configure the user information field to indicate different information. If the AID subfield is set to the first value, the user information field includes information indicating whether resources are allocated for random access, whereby allowing the one or more STAs to transition to a doze state on the basis of the information indicating whether resources are allocated for random access.

Advantageous Effects

According to the present invention, it is possible to maximize the PS efficiency by providing subsequent scheduling information per user while minimizing the signaling overhead.

In addition, random access STAs can efficiently reduce their power consumption in a situation in which random access STAs coexist with scheduling-based STAs.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

FIG. 2 is a diagram for explaining a power saving method in UL MU transmission.

FIGS. 3 to 5 are diagrams for explaining trigger frame formats used in an HE system.

FIG. 6 is a diagram for explaining a method of using NI in TFs according to an embodiment of the present invention.

FIG. 7 is a diagram for explaining a method for performing doze state transition based on a TWT SP while using NI in TFs according to an embodiment of the present invention.

FIG. 14 is a diagram illustrating a trigger frame structure according to an embodiment of the present invention.

FIG. 15 is a diagram illustrating a structure of an SS Allocation subfield in the case where an AID field indicates resource allocation for random access according to an embodiment of the present invention.

BEST MODE FOR CARRYING OUT THE INVENTION

Hereinafter, exemplary embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out. In addition, the detailed description includes specific details for the purpose of providing a thorough understanding of the present invention. However, it will be apparent to those skilled in the art that the present invention can be practiced without the specific details.

Figure 1:
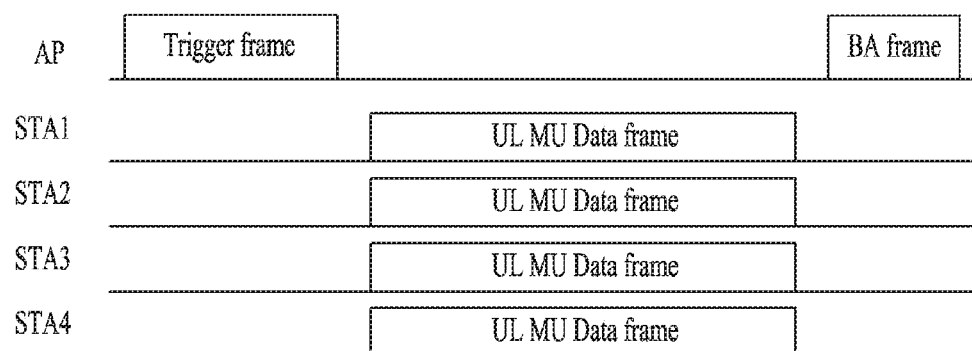
FIG. 1 is a diagram for explaining a UL MU transmission situation to which the present invention is applicable.

FIG. 1 is a diagram for explaining a UL MU transmission situation to which the present invention is applicable.

A UL MU transmission scheme may be used in an 802.11ax system as described above and may be initialized when an AP transmits a trigger frame to a plurality of STAs (e.g., STA 1 to STA 4) as illustrated in FIG. 1. The trigger frame may include UL MU allocation information (e.g. resource location and size, STA IDs, an MCS, and an MU type (MIMO, OFDMA, etc.)). Specific examples of information transmitted in the trigger frame may be as follows.

TABLE 1

Duration of UL MU frame
Number of allocation (N)
Each allocation's Information
SU/MU
AID (for MU, as many AIDs as the number of STAs are included.)
Power adjustment
Tone(/Resource) allocation information (e.g., bitmap)
MCS
Nsts
STBC
Coding
Beamformed
Etc.

Meanwhile, as illustrated in FIG. 1, the AP may obtain a TXOP for transmitting the trigger frame via a contention procedure in order to access a medium. The STAs may transmit UL data frames with a format indicated by the AP after an SIFS of the trigger frame. Thereafter, the AP may transmit acknowledgements in response to the UL MU data frames in Block ACK (BA) frames. In this case, the AP may transmit the acknowledgements in various ways such as individual ACK, Multi-STA BA (M-BA), and the like as well as BA.

FIG. 2 is a diagram for explaining a power saving method in UL MU transmission.

In an HE system, a Cascade Indicator (CI) may be included in a trigger frame for PS operation of STAs performing UL multiple access. If CI=1, it means that subsequent trigger frames will be transmitted. On the contrary, if CI=0, it means that there is no subsequent trigger frame.

As shown in FIG. 2, when a plurality of Trigger Frames (TFs) are transmitted within one TWT Service Period (SP), STAs should maintain the awake state until receiving a TF with CI=0. This can be applied when STA 4 is scheduled by the first TF and STA 3 is scheduled by the first and second TFs as shown in FIG. 2. In other words, all STAs should maintain the awake state until receiving the TF with CI=0. That is, power is consumed in the 'possible doze state but awake state' shown in FIG. 2.

As described above, HE STAs can perform the power saving operation using TF start times included in beacon frames and CIs included in TFs. However, the TF start time or cascade indication is included in a TF for random access, and thus it is applied to all power saving STAs that receive the TF. Thus, the power may be wasted as shown in FIG. 2.

In an embodiment of the present invention, a UL MU TXOP power saving method for reducing power consumption of STAs scheduled by scheduled TFs rather than OFDMA random access is proposed. The method can be used to reduce the power consumption of not only the scheduled STAs but STAs performing the OFDM random access. Before describing the method, a TF to which subsequent scheduling information per individual user can be added will be explained in detail.

FIGS. 3 to 5 are diagrams for explaining trigger frame formats used in an HE system.

FIG. 3 shows the overall structure of a TF, FIG. 4 shows the Common Info field of the TF configuration, and FIG. 5 shows the Per User Info field of the TF configuration.

In FIG. 3, the Duration field indicates the duration of a corresponding TXOP and the RA/TA fields indicates the IDs of transmitting and receiving STAs.

The Length subfield of the Common Info field shown in FIG. 4 may indicate the value of the L-SIG Length field of the HE trigger-based PPDU transmitted in response to the corresponding TF. The CI subfield may indicate whether there is a subsequent TF as described above. The CS Required subfield may indicate whether the STAs, which are identified by the Per User Info field, consider media states and NAVs in order to determine whether to respond and whether the STAs require ED to sense the media. The HE-SIG-A Info subfield may indicate the content of the HE SIG-A field in the HE-trigger-based PPDU response.

The CP and LTE subfields may indicate the types of the CP and HE-LTF of the HE trigger-based PPDU as shown in Table 2 below.

TABLE 2

| CP and LTF field value | Description |
| --- | --- |
| 0 | 2 × LTF + 0.8 μs CP |
| 1 | 2 × LTF + 1.6 μs CP |
| 2 | 4 × LTF + 3.2 μs CP |
| 3-TBD | Reserved |

Meanwhile, the Trigger Type subfield may indicate the type of the corresponding TF as shown in Table 3 below.

TABLE 3

| Trigger Type value | Trigger Type description |
| --- | --- |
| 0 | Basic Trigger |
| 1 | Beamforming Report Poll Trigger |
| 2 | MU-BAR |
| 3 | MU-RTS |
| 4-TBD | Reserved |

The User Identifier subfield of the Per User Info field shown in FIG. 5 indicates the AID of the STA that will transmits an MPDU(s) in response to the corresponding TF. The RU Allocation and Coding Type subfields indicate the resource and coding scheme to be used for the HE trigger-based PPDU response, respectively. The MCS and DCM subfields may respectively indicate whether MCS and DCM will be applied to the HE trigger-based PPDU transmission, and the SS allocation subfield may indicate the spatial streams of the HE Trigger-based PPDU response.

I. STA Operation According to Scheduling Scheme

Based on the above-described UL MU transmission structure and TF structure, a method according to an embodiment of the present invention proposes: an STA receives a first TF from an AP; the STA transmits a PPDU to the AP in response to the first TF using a multi-user scheme, wherein the first TF includes subsequent scheduling information per STA; and the first STA transitions to a doze state based on the subsequent scheduling formation per STA. In this case, the subsequent scheduling information per STA is different from the above-described CI information applied to all STAs. In addition, from the perspective of the first STA, which is scheduled by the TF, if the subsequent scheduling information per STA indicates that there is no subsequent scheduling for the first STA, it is desirable that the first STA transitions to the doze state even through the CI indicates that there is a second subsequent TF.

To this end, it is preferred that when the AP transmits the TF, the AP also transmits the above-described subsequent scheduling information per STA by including it in the Per User Info field. In the following description, the subsequent scheduling information per STA can be interpreted as various concepts such as "Next Scheduling Indication", "No Resource Allocation", "No Scheduling", "More Trigger", "No More Trigger", etc. In the following embodiments, when the subsequent scheduling information per STA is defined as the Next scheduling Indication (NI), the NI can be set to 1 (NI=1) in case there is subsequent scheduling. On the contrary, if there is no subsequent scheduling, the NI can be set to 0 (NI=0).

The NI indicates whether a corresponding STA receives additional scheduling (or resource allocation) in a corresponding TXOP or not. If the NI is set to 1, it indicates that additional resource allocation information for the corresponding STA is included in the next TF. Thus, the STA should maintain the awake state until receiving the next TF (or until the corresponding TXOP expires or the designated TWT SP ends).

If the NI is set to 0, it indicates that additional resource allocation information for the corresponding STA is not included in the next TF. Thus, the STA transmits a UL MU frame in response to the received TF. Upon receiving DL MU ACK from the AP in response to the UL MU frame, the STA enters and maintains the doze state until the corresponding TXOP ends (or until the corresponding TWT SP ends).

FIG. 6 is a diagram for explaining a method of using NI in TFs according to an embodiment of the present invention.

In FIG. 6, it is assumed that in the first TF, the NI is set to 1 for STAs 1, 2 and 3 and 0 for STA 4. Thus, STAs 1, 2, and 3 wait for the next TF, whereas STA 4 enters and maintains the doze state until the end of the TXOP after receiving DL MU BA.

In the second TF, since the NI is set to 1 for STAs 1 and 2 and 0 for STA 3, STAs 1 and 2 waits for the next TF, but STA 3 transmits a UL MU frame in an allocated resource region of the TF. After receiving a response (DL MU BA) in response to the UL MU frame, STA 3 enters and maintains the doze state until the remaining TXOP ends. In other words, in this example, NI=0 instructs to enter and maintain the doze state until the end of the remaining TXOP.

Although FIG. 6 assumes that the transition to the doze state is determined based on a TXOP, the present invention is not limited thereto. In particular, the doze state transition can be performed as follows based on a TWT SP.

FIG. 7 is a diagram for explaining a method for performing the doze state transition based on a TWT SP while using NI in TFs according to an embodiment of the present invention.

Referring to FIG. 7, it can be seen that when STAs 3 and 4 receive the first TF, the NI is set to 0. Thus, STAs 3 and 4 enter and maintain the doze state until the end of the TWT SP after receiving the first DL MU BA from the AP. In addition, it can be seen that when STAs 1 and 2 receive the second TF, the NI is set to 0. Thus, STAs 1 and 2 transmit UL frames and then receive the second DL MU BA. Thereafter, STAs 1 and 2 enter and maintain the doze state until the end of the remaining TWT SP.

That is, in this example, NI=0 instructs to enter and maintain the doze state until the remaining TWT SP ends.

Meanwhile, the doze state transition can be performed based on Next Target Beacon Transmission Time (TBTT) besides the above-described TXOP and TWT SP. That is, if corresponding indication (e.g., NI) is set to 0, a user equipment may enter and maintain the doze state until the Next TBTT.

Figure 8:
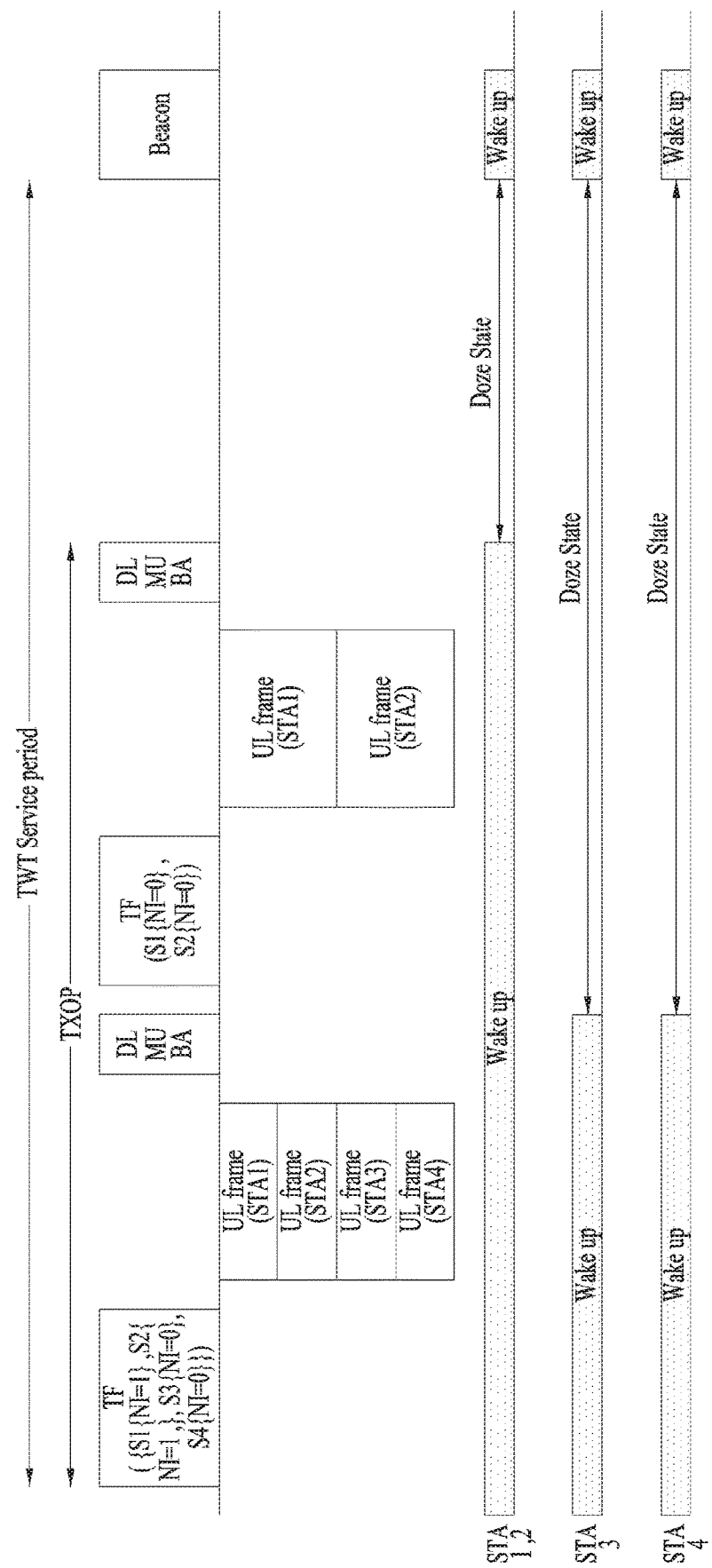
FIG. 8 is a diagram for explaining a method for performing doze state transition based on Next TBTT while using NI in TFs according to an embodiment of the present invention.

FIG. 8 is a diagram for explaining a method for performing the doze state transition based on Next TBTT while using NI in TFs according to an embodiment of the present invention.

Referring to FIG. 8, it can be seen that when STAs 3 and 4 receive the first TF, the NI is set to 0. Thus, STAs 3 and 4 enter and maintain the doze state until receiving a next beacon after receiving the first DL MU BA from the AP. In addition, it can be seen that when STAs 1 and 2 receive the second TF, the NI is set to 0. Thus, after receiving the second DL MU BA, STAs 1 and 2 enter and maintain the doze state until the next beacon is received.

FIGS. 6 to 8 show that the doze state transition is performed based on a TXOP, TWT, and TBTT, respectively. However, according to an embodiment of the present invention, which one of the aforementioned methods will be used to determine the doze state transition can be additionally signaled.

According to an embodiment of the present invention, a TF may include Doze state type Indication (DI). Specifically, when the DI is set to 0 (DI=0), it indicates to enter and maintain the doze state until the end of a TXOP. On the contrary, when the DI is set to 1 (DI=1), it indicates to enter and maintain the doze state until the end of a TWT SP.

Figure 9:
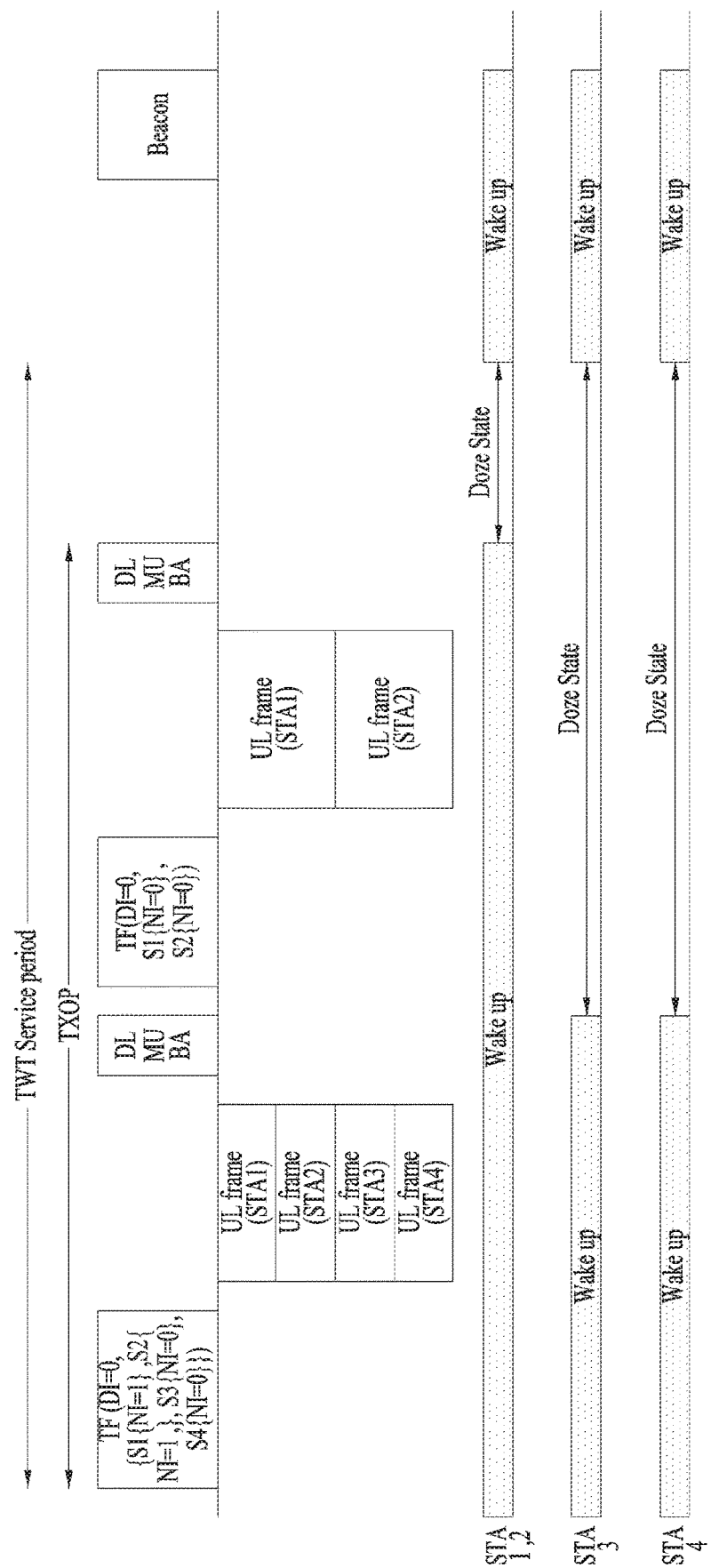
FIGS. 9 and 10 illustrate cases in which DI is included in TFs according to an embodiment of the present invention.
Figure 10:
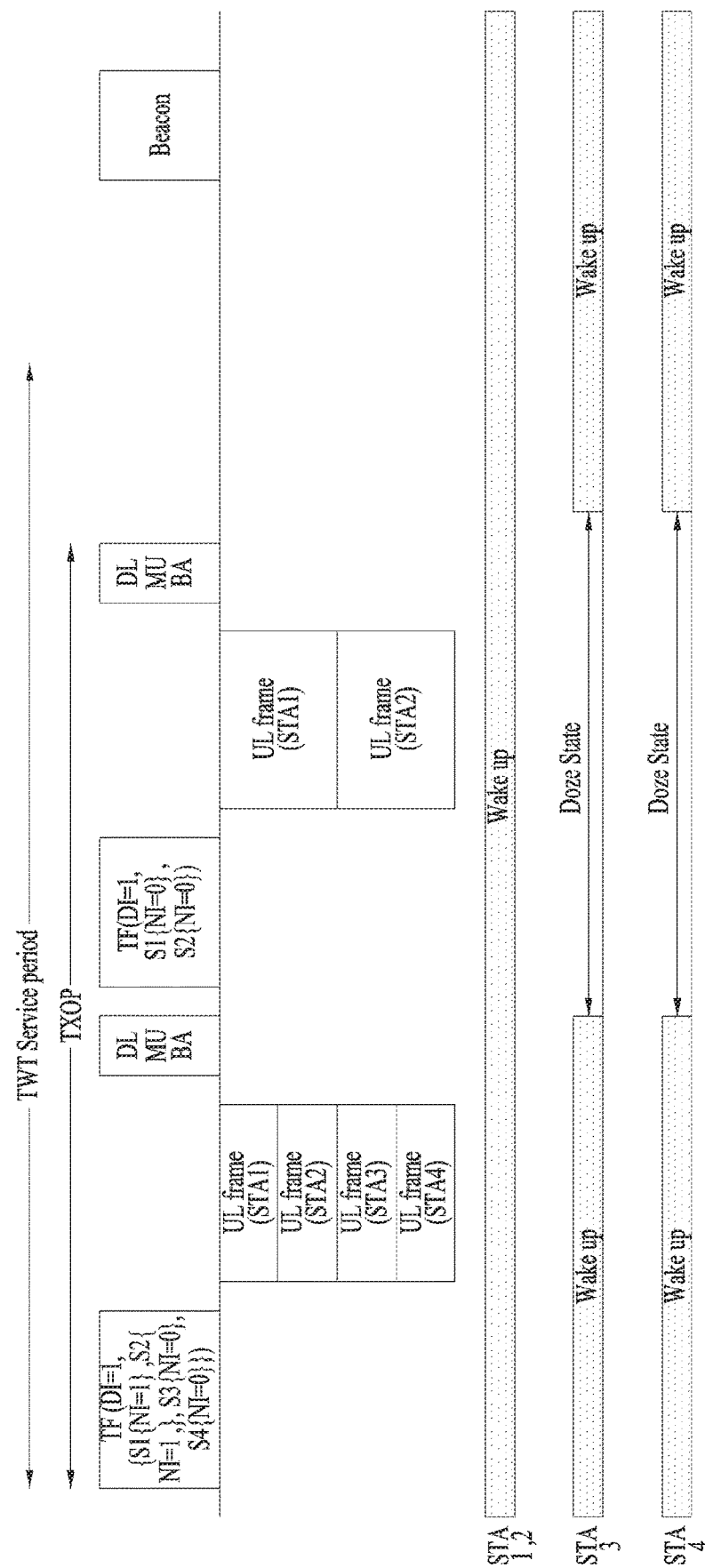

FIGS. 9 and 10 illustrate cases in which DI is included in TFs according to an embodiment of the present invention.

Specifically, FIG. 9 shows that the DI is set to 0 (DI=0) so that STAs enter and maintain the doze state until the TWT SP, and FIG. 10 shows that the DI is set to (DI=1) so that STAs enter and maintain the doze state until the end of the TXOP. In FIGS. 9 and 10, the same operation as the above-described embodiment is used to determining the doze state transition using NI.

The aforementioned DI can be implemented using 2-bit information as shown in Table 4 below.

TABLE 4

00: TWT SP based
01: TXOP based
10: Next TBTT based
11: reserved

In the above two example, the DI may be included in the Common Info field of the TF so that all STA can read the DI, or it may be included in the Common Info (i.e., Trigger-dependent Common Info) field of the TF corresponding to OFDMA random access so that only STAs performing the OFDM random access can read the DI.

In addition, the DI may be separately notified. For example, the DI may be transmitted, being included in the Per User Info field of the TF or the Trigger-dependent Per User Info field. In this example, the DI corresponds to one bit. Specifically, 0 indicates doze state operation based on a TWT SP, and 1 indicates doze state operation based on a TXOP.

Figure 11:
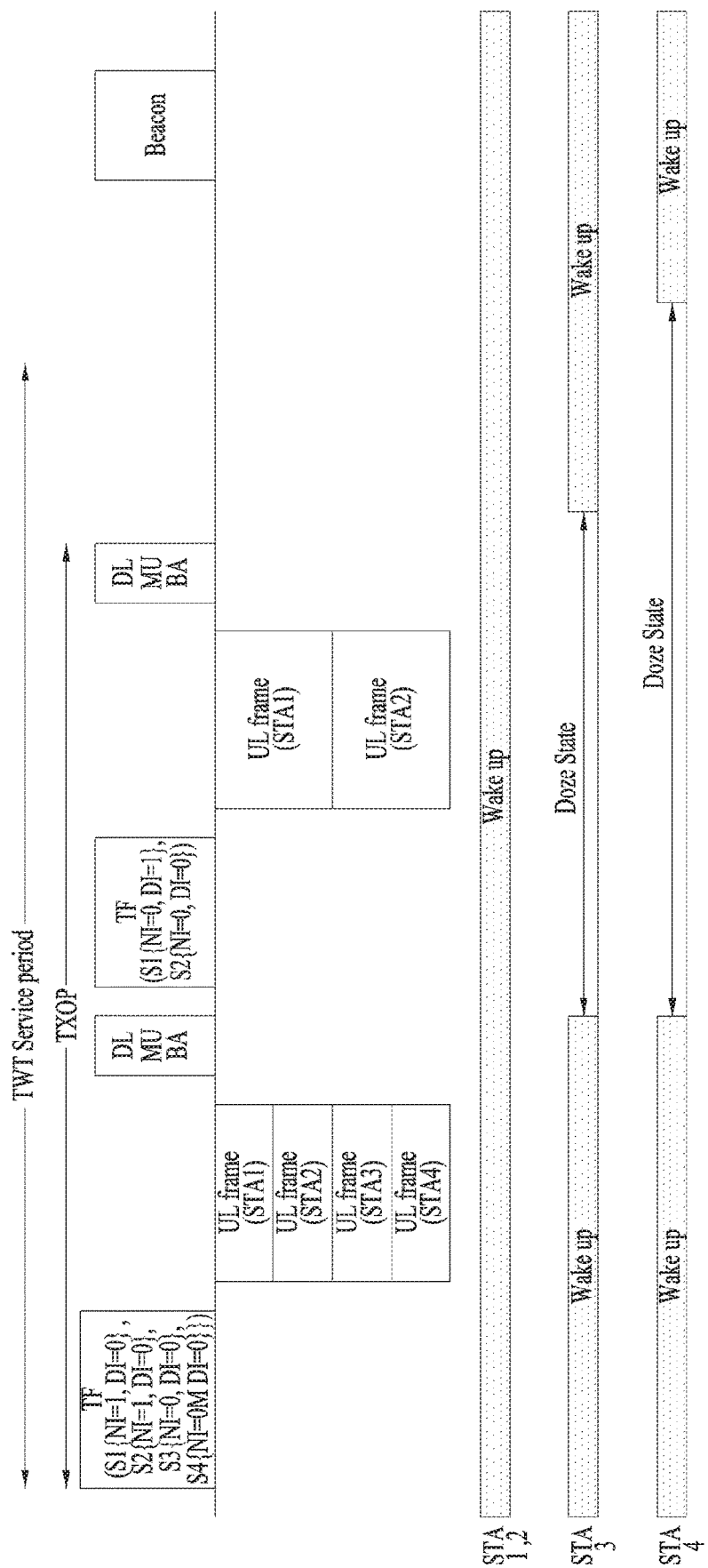
FIG. 11 illustrates an example of operating separately configured DI according to an embodiment of the present invention.

FIG. 11 illustrates an example of operating separately configured DI according to an embodiment of the present invention.

In the example of FIG. 11, since the DI of STA 3 is set to 1, STA 3 enters and maintains the doze state until the end of the corresponding TXOP. On the other hand, since the DI of STA 4 is set to 0, STA 4 enters and maintains the doze state until the end of the TWT SP.

In the above example, the DL MU BA and TF may be transmitted through one A-MPDU or one MPDU (i.e., in one control frame). The DL MU BA and TF may be transmitted at an interval of an SIFS or PIFS. Alternatively, after transmission of the DL MU BA, the TF may be transmitted based on EDCA.

In another embodiment of the present invention, the DI can be replaced with doze state time information indicating when and how long an STA should enter and maintain the doze state for. The corresponding information indicates the time when the STA wakes up from the doze state, and it may be represented as absolute or relative time information.

It is apparent that the term "Next Scheduling Indication" can be replaced with other terms in the present invention. For example, when the term "Next Scheduling Indication" is replaced with the term "No More Trigger" and a corresponding bit is set to 0, a corresponding STA maintains the awake state during TXOP or a TWT SP. On the contrary, when the corresponding bit is set to 1, the STA enters and maintains the doze state during the remaining TXOP period or TWT service period.

The Doze state type Indication (DI) can also be replaced with other terms. When the DI is replaced with the term "More Trigger" and a corresponding bit is set to 0, a corresponding STA enters and maintains the doze state during the remaining TXOP or TWT service period. On the contrary, if the corresponding field (bit) is set to 1, the STA may be configured to wait for reception of a next TF.

Operation Associated with Cascade Indication Field

The above-described operations and fields (e.g., No More Trigger/Next Scheduling Indication, Doze State Type Indication, etc.) can be defined and used through association with the Cascade Indication field included in the Common Info field.

When STAs are not scheduled by TFs, the STAs may perform the above-described operation using the Cascade Indication field included in the Common Info field. In other words, if the Cascade Indication field of the TF is set to 1, the corresponding STAs can maintain the awake state. On the contrary, if the Cascade Indication field is set to 0, the corresponding STAs can enter the doze state.

When STAs are scheduled by TFs, the STAs can enter and maintain the doze state during a predetermined time if the Cascade Indication field is set to 0. If the Cascade Indication field is set to 1, the scheduled STAs may operate using information in the above-described fields (e.g., No More Trigger/Next Scheduling Indication, Doze State Type Indication, etc.). For example, when the Cascade Indication field is set to 1 and when the No More Trigger field included in the Per User Info field is set to 1 (i.e., No More Trigger=1) (and/or NI=0), a scheduled STA enters the doze state. On the contrary, in the case of No More Trigger=0 (and/or NI=1), the scheduled STA maintains the awake state. In this case, the STA may maintain the doze state until the end of TWT Service period/TXOP/Next TBTT as described above.

In the case of OFDMA random access (i.e., when the AID of the Per User Info field is 0), the No More Trigger (and/or Next UL scheduling Indication and/or More Trigger) field may be used to reduce power consumption of unassociated STAs.

More DL Data Information

It is desirable that the above-described methods are configured to be applied only when there is no DL data transmitted from an AP. For example, when there is a DL data frame in response to UL transmission, an STA does not enter the doze state even in the case of No More Trigger=1.

However, in the case of No More Trigger=1 (or NI=0), an STA can enter the doze state if any one of the following options is satisfied.

Option 1: If an STA is allocated UL MU resources through a TF where No More Trigger for the corresponding STA is set to 1 (or NI=0), the STA transmits a UL MU frame on the allocated resources, enters the doze state at the end of DL MU BA, and then maintains the doze state until the end of the remaining TXOP or TWT SP, regardless of whether DL MU ACK/BA (e.g., M-BA) is successfully received or not.

Option 2: If an STA is allocated UL MU resources through a TF where No More Trigger for the corresponding STA is set to 1 (or NI=0), the STA transmits a UL MU frame on the allocated resources. Thereafter, if DL MU ACK/BA is correctly received (e.g., when DL OFDMA ACK/BA or an M-BA frame is correctly received or when the received M-BA frame contains ACK/BA information for the AID of the corresponding STA), the STA may enter the doze state. In this case, if the STA fails to receive the DL MU BA after transmitting the UL MU frame (HE trigger-based PPDU) (e.g., when the DL OFDMA ACK/BA or M-BA frame is successfully received or when the received M-BA frame contains the ACK/BA information for the AID of the corresponding STA), the STA maintains the awake state.

In summary, if More Trigger (No More Trigger or Next UL Scheduling) does not indicate that a next TF contains the trigger information for an HE STA (i.e., UL MU resource allocation information) (that is, if More Trigger=0), the HE STA may enter the doze state after receiving a response (ACK/BA) to UL MU transmission and maintain the doze state until the end of the remaining TWT SP or during the TXOP.

In this case, information indicating whether there is DL data to be transmitted to an STA may be included in a TF. For example, More DL Data information may be included in the Per User Info field. Thus, if an STA receives a TF with More Trigger set to 0, the STA may determine whether to enter the doze state based on the More DL Data information.

The More DL Data information can be determined according to one of the following rules.

(1) It indicates whether there is DL data to be transmitted to an STA.

(2) It indicates whether there is DL data to be transmitted to an STA during a configured TXOP or TWT SP. This could be interpreted as follows. Although the DL data to be transmitted to the corresponding STA is present, if it is not scheduled during the TWT SP, a corresponding field is set to 0. On the contrary, if it is scheduled during the TWT SP, the corresponding field is set to 1.

The More DL Data information can be transmitted through the Per User Info field of the TF, but it can also be transmitted through Multi-STA Block ACK (BA). For example, if an AP transmits ACK/BA for UL MU frame reception through Multi-STA BA, the AP may transmit More DL Data information for each STA by including it in the Multi-STA BA (for example, in the Per STA Information field of the Multi-STA BA, a specific field (e.g., the TID subfield of the Per AID Info field) may be defined using a specific value (e.g., 1111) or one bit). By doing so, upon receiving the Multi-STA BA, an STA may know whether the AP will transmit DL data. If there is no DL data, the SAT enters the doze state until the end of the remaining TWT SP or during the TXOP depending on situations.

If More Trigger and More DL Data are included in the Per User Info field of a TF, STAs indicated by User Identifier in the Per User Info field (or STAs for AID=0) may determine whether to enter the doze state during the remaining TXOP or TWT SP. For example, when both More Trigger and More DL Data are set to 0, the STAs can enter the doze state. In other words, if either More Trigger or More DL Data is set to 1, the corresponding STA(s) cannot enter the doze state. It can be equally applied when Multi-STA Block includes the More Trigger and More DL Data.

The More Trigger and More DL Data information can be defined as a single field. For example, the More Trigger and More DL Data information may be defined as a More DL/UL Resource Allocation (MRA) field or transmitted, being included in the Per User Info field.

If an AP has no DL data to be transmitted to an STA(s) during a TWT SP or TXOP and no longer transmits trigger information for UL resource allocation to the corresponding STA(s), the AP sets a corresponding field to 0. When the corresponding field is set to 0, the corresponding STA(s) performs UL MU transmission in response to a TF and then receives a response (ACK/BA) to the UL MU transmission. Thereafter, the corresponding STA(s) may enter the doze state until the end of the remaining TWT SP or during the TXOP. Similar to the above-described More Trigger or More DL Data field, the MRA field may be transmitted to each STA, being included in the Per STA Information field of Multi-STA BA. In this case, if the corresponding field is set to 0, the corresponding STA(s) enters the doze state until the end of the remaining TWT SP or during the TXOP.

Figure 12:
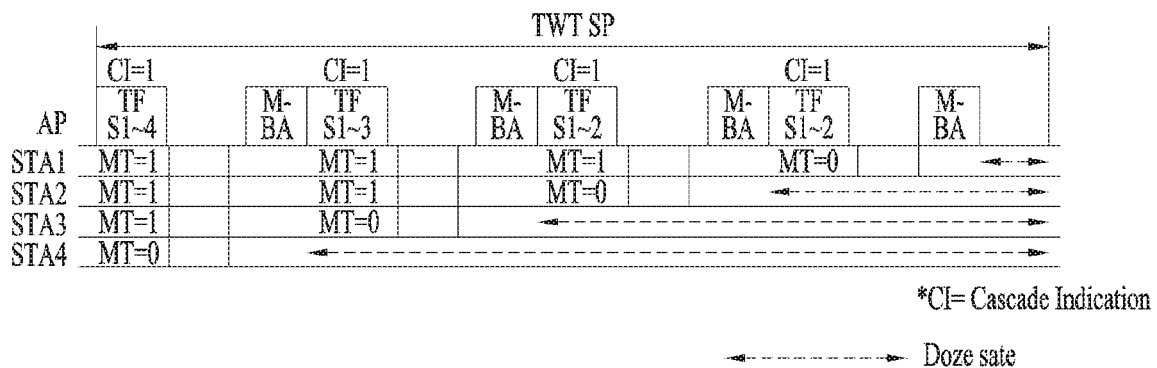
FIG. 12 is a diagram for explaining a method of using the More DL Data field according to an embodiment of the present invention.

FIG. 12 is a diagram for explaining a method of using the More DL Data field according to an embodiment of the present invention.

Referring to the example of FIG. 12, since More Trigger (MT) of the first TF is set to 0, STA 4 transmits a UL MU frame, receives M-BA/DL MU BA, and then enters the doze state. In addition, since MT of the second TF is set to 0, STA 3 transmits a UL MU frame, receives M-BA/DL MU BA, and then enters the doze state. Moreover, since MT of the third TF is set to 0, STA 2 transmits a UL MU frame, receives M-BA/DL MU BA, and then enters the doze state. Further, since MT of the fourth TF is set to 0, STA 1 transmits a UL MU frame, receives M-BA/DL MU BA, and then enters the doze state.

If STAs fail to correctly receive DL MU ACK/BA or if ACK/BA information for the corresponding STAs is not included in received M-BA frames, the STAs maintain the awake state. The TF may include the above-described MRA field instead of MT. In addition, if the STAs know that the AP will transmit DL frames to the corresponding STAs (e.g., when the More Data fields of DL frames are set to 1), the STAs do not enter the doze state even if the above conditions are satisfied.

If the STAs do not need to receive ACK/BA after transmitting UL MU frames (i.e., if the ACK policy on UL MU frames is set as no ACK), the corresponding STAs may enter the doze state immediately after transmitting the UL MU frames.

If the STAs requires ACK/BA, the STAs may wait for the ACK until ACK timeout after transmitting UL MU frames. Thereafter, the STAs may enter the doze state. This corresponds to a case in which although the AP transmits DL MU ACK/BA, the STAs fail to correctly receive the ACK/BA due to the occurrence of errors. In addition, if the AP fails to correctly receive the UL MU frames, polling can be performed before ACK timeout.

The aforementioned method can be used to reduce power consumption of STAs that perform OFDMA random access only (e.g., unassociated STAs in cell edges) when the resource allocation for the OFDMA random access coexist with the UL MU resource allocation for scheduled STAs.

Figure 13:
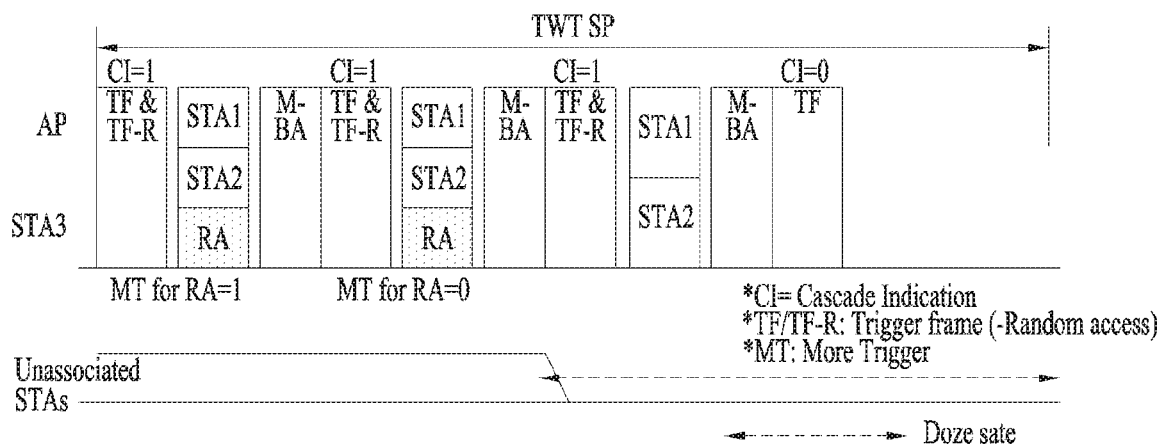
FIG. 13 is a diagram for explaining a power saving method for an unassociated STA according to an embodiment of the present invention.

FIG. 13 is a diagram for explaining a power saving method for an unassociated STA according to an embodiment of the present invention.

Referring to the example of FIG. 13, in the first TF, the resource allocation for STAs 1 and 2 and the resource allocation for OFDMA random access (AID for Per User Info=0) is performed. In the case of STAs configured to perform only the OFDMA random access (e.g., unassociated STAs), the STAs attempt to perform the random access after receiving the first TF. However, since the More Trigger field for the random access of the first TF is set to 1, the STAs wait for a next TF. Upon receiving the second TF, the STAs perform the random access. In this case, the More Trigger field for the random access is set to 0, the STAs enter the doze state after completing the radon access (e.g., when the STAs receive DL MU ACK/BA or Multi-STA BA for random access UL transmission).

I. Operation of Random Access STA

Now, a description will be given below of a method of efficiently reducing power consumption from the perspective of a random access STA according to another aspect of the present invention.

It may be considered that the above-defined field (e.g., More Trigger/Per User Cascade Indication/Next Scheduling Indication/No More Trigger, etc.) indicates End of Service Period (EOSP). That is, the field indicates the end of a TWT SP, and thus an STA may enter the doze state. As described before, the field may implicitly indicate no more DL data for the STA.

As stated before, for UL MU TWT power saving, a new field (e.g., More Trigger/Per User Cascade Indication/Next Scheduling Indication/No More Trigger/EOSP, etc.) may be defined in the User Info field or Trigger Dependent User Info field of a trigger frame, and an unused one of existing fields or a specific value of a field may indicate the end of a service.

In the following description, it is proposed that for a random access STA, information indicating whether resources are allocated for random access, corresponding to the afore-described information such as EOSP or the like is used by reconfiguring a value of the User Info field of the legacy trigger frame, without including the information in an additional field of the trigger frame.

FIG. 14 is a diagram illustrating the structure of a trigger frame according to an embodiment of the present invention.

The trigger frame illustrated in FIG. 14 may be configured by modifying/embodying some subfields of the trigger frame illustrated in FIG. 5.

In the trigger frame of FIG. 14, it is assumed that an AID12 subfield indicates 12 Least Significant Bits (LSBs) of the AID of an STA for which the User Info field is destined. If the AID12 subfield is set to 0 or 2045, this implies that the User Info field indicates RU allocation for random access. A random access operation in this case is referred to as UL OFDM-based Random Access (UORA).

Further, the trigger frame illustrated in FIG. 14 may include a Spatial Stream (SS) Allocation subfield that provides information about a spatial stream of a PPDU transmitted in response to the trigger frame, a Modulation and Coding Scheme (MCS) subfield indicating an MCS to be applied to the PPDU, and a Target Received Signal Strength Indicator (RSSI) subfield indicating a target RSSI for the PPDU.

In the trigger frame having the above structure, information indicating whether random access resources are allocated may be delivered in a Reserved field in FIG. 14.

In a preferred embodiment of the present invention, however, since information included in the SS Allocation subfield, the MCS subfield, and the target RSSI subfield of the User Info field are mainly for a scheduling-based STA, it is proposed that a subfield indicating whether random access resources are allocated is added in a position corresponding to one or more of these subfields.

That is, it is proposed that the User Info field indicates different information when the AID subfield of the User Info field is set to a first value (e.g., 0 or 2045), and when the AID subfield of the User Info field is set to a value other than the first value.

Figure 16:
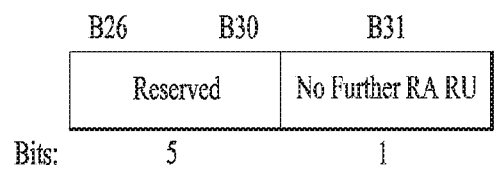
FIG. 16 is a diagram illustrating a structure of the SS Allocation subfield in the case where the AID field does not indicate resource allocation for random access according to an embodiment of the present invention.

FIG. 15 is a diagram illustrating a structure of the SS Allocation subfield in the case where the AID subfield indicates resource allocation for random access according to an embodiment of the present invention, and FIG. 16 is a diagram illustrating a structure of the SS Allocation subfield in the case where the AID subfield does not indicate resource allocation for random access according to an embodiment of the present invention.

When resources are allocated to an STA that performs OFDMA random access, the resources are not allocated in MU-MIMO. Accordingly, the Starting Spatial Stream of the SS Allocation subfield always indicates the first stream, thus typically being set to 0 (the first stream). That is, the Starting Spatial Stream illustrated in FIG. 15 may mean nothing to the random access STA.

Therefore, when the Starting Spatial Stream is set to a specific non-zero value (e.g., 1), the value may be configured to have the same meaning as the afore-defined new field (e.g., one of More Trigger/Per User Cascade Indication/Next Scheduling Indication/No More Trigger/EOSP). That is, when the Starting Spatial Stream is set to the specific non-zero value (e.g., 1), the STA may enter the doze state, considering that an AP allocates no more UL resources to the STA and has no DL data to be transmitted to the STA.

If the Starting Spatial Stream is not used, a specific bit (e.g., MSB or LSB) of the Starting Spatial Stream field, instead of a specific value, may indicate EOSP or the like. For an STA with AID=0 or 2045 (i.e., resource allocation for OFDMA random access), EOSP (1) may indicate that no more trigger frame including a resource allocation for OFDMA random access is transmitted within a corresponding TWT SP or a specific TXOP. That is, no trigger frame for OFDMA random access may be transmitted until the end of the TWT SP or TXOP after the corresponding trigger frame.

Except for the AID and RU Allocation subfields, the remaining subfields of the User Info field in the trigger frame may not be used for resource allocation for OFDMA random access. That is, the following subfields except for the afore-described Starting Spatial Stream subfield may be used for a random access STA, for other usages.

MCS or DCM: Since a resource area for OFDMA random access is for transmission of an unspecified STA, the MCS and DCM subfields may be set to fixed values. A fixed MCS such as MCS 0 may be used, or an MCS may be known by a system parameter. As such, if the MCS subfield is not used for a random access STA, a specific value or a specific bit of the MCS subfield may be used for the EOSP purpose. If DCM 0 is always fixedly used in the system, a corresponding bit of the DCM subfield may be used for the EOSP purpose. That is, a value of 1 indicates EOSP.

Number Of Spatial Streams: If the number of spatial streams is fixed to 1 or 2, a specific value (e.g., 1) or a specific bit (e.g., MSB or LSB) of the Number Of Spatial Stream subfield may also be used to indicate EOSP.

If a target RSSI is fixed for OFDMA random access, and known to the STA by a system parameter, the Target RSSI subfield may be reused such that its specific value (e.g., 1) or specific bit (e.g., MSB or LSB) indicates EOSP.

Meanwhile, FIG. 16 illustrates reconfiguration of the SS Allocation Info subfield as information for a random access STA, when the AID subfield indicates(does not indicate?) random access resource allocation. As illustrated in FIG. 16, 'No Further RA RU' may indicate that no resources are allocated for random access by trigger frames subsequent to a corresponding trigger frame.

The following description is given with the appreciation that although No Further RA RU information may be replaced with the term, EOSP, it indicates whether RU allocation is performed or not for random access from the perspective of a random access STA.

Upon receipt of a trigger frame indicating no further RU allocation for random access as described above, a random access STA may enter the doze state immediately, unless the random access STA performs random access in response to the reception of the trigger frame.

Figure 17:
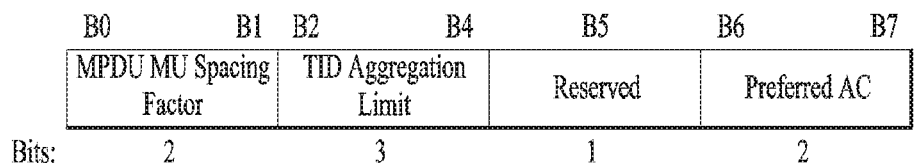
FIG. 17 is a diagram illustrating a Trigger Dependent User Info subfield for a basic trigger variant according to an embodiment of the present invention.

FIG. 17 is a diagram illustrating the Trigger Dependent User Info subfield for a basic trigger variant according to an embodiment of the present invention.

In the case of resource allocation for OFDMA random access (e.g., AID=0), a trigger frame is configured as a basic trigger type, and the Trigger Dependant User Info subfield includes fields for a basic trigger variant, as illustrated in FIG. 17.

Since the fields of FIG. 17 are defined mainly for a scheduled trigger STA, the fields may be used mainly for transmission of a control frame or a management frame, not for resource allocation for OFDMA random access. Therefore, one of MPDU MU Spacing Factor, TID Aggregation Limit, AC Preference Level, and Preferred AC fields illustrated in FIG. 17 may be used to indicate EOSP, and if EOSP is indicated, the STA may enter and maintain the doze state until the end of a TWT SP or TXOP, considering that the AP allocates no more resources for OFDMA random access in trigger frames (i.e., trigger frames with AID=0 or 2045) subsequent to a corresponding trigger frame during the TWP SP or TXOP. In this case, the STA may enter the doze state immediately after receiving the trigger frame.

That is, it may be indicated that no resources are allocated for random access from a current trigger frame to the end of the TWT SP (or TXOP) in OFDMA random access.

Figure 18:
FIG. 18 is a diagram for explaining an operation of a random access STA according to an embodiment of the present invention.

FIG. 18 is a diagram for explaining an operation of a random access STA according to an embodiment of the present invention.

When STAs performing OFDMA Random Access (RA) (referred to as RA STAs) receive a second trigger frame, if the trigger frame indicates no further resource allocation for OFDMA random access (AID=0) in trigger frames which are transmitted from the current frame to the end of an SP (e.g., TXOP or TWT SP), the RA STAs may enter the doze state after receiving the trigger frame.

In the above example, there is no resource allocation for OFDMA random access in second and third trigger frames. Information indicating no resource allocation for OFDMA random access is included in all of trigger frames from the second trigger frame until the end of the SP in the above example.

It is preferred that information indicating no further resource allocation for OFDMA random access (AID=0) in trigger frames which are transmitted from the current frame to the end of the SP is included only in a corresponding first frame including no resource allocation information (the second frame in FIG. 18).

Figure 19:
FIG. 19 is a diagram for explaining an operation of a random access STA according to another embodiment of the present invention.

FIG. 19 is a diagram for explaining an operation of a random access STA according to another embodiment of the present invention.

In FIG. 19, information indicating no further resource allocation for OFDMA random access (AID=0) in trigger frames which are transmitted from the current frame to the end of an SP is included only in the second frame including no resource allocation information. Therefore, a random STA succeeding in receiving the second trigger frame enters and maintains the doze state until the end of a TWT SP (or TXOP) after receiving the second trigger frame. However, an RA STA failing in receiving the second trigger frame may not enter the doze state.

Information indicating no resource allocation for OFDMA random access (AID12=0) may be known in the following method.

A specific value of the RU Allocation subfield may indicate no resource allocation for OFDMA random access (AID 12=0). Such an example is illustrated in Table 5 below.

TABLE 5

| B19-B13 | Description | Number of entries |
|---|---|---|
| 0000000-0100100 | Possible 26-tone RU cases in 80 MHz | 37 |
| 0100101-0110100 | Possible 52-tone RU cases in 80 MHz | 16 |
| 0110101-0111100 | Possible 106-tone RU cases in 80 MHz | 8 |

TABLE 5-continued

| B19-B13 | Description | Number of entries |
|---|---|---|
| 0111101-1000000 | Possible 242-tone RU cases in 80 MHz | 4 |
| 1000001-1000010 | Possible 484-tone RU cases in 80 MHz | 2 |
| 1000011 | 996-tone RU cases in 80 MHz | 1 |
| 1000100 | 2 × 996-tone RU case | 1 |
| 1111111 | RU empty | 1 |
| Total | | 70 |

One value of the RU Allocation subfield (e.g., 1111111 in the above example and 1000101 is also available) indicates RU Empty in one of the meanings of the following options.

Option 1: It indicates no RU allocation for the current AID12 in the current trigger frame.

Option 2: It indicates no RU allocation for the current AID12 from the current trigger frame to the end of an SP (TWT SP or TXOP).

Option 3: It indicates that only when AID12 is set to 0 or 2045, the corresponding value is valid, and there is no RU allocation for AID12=0 (OFDMA random access) in the current trigger frame.

Option 4: It indicates that only when AID12 is set to 0 or 2045, the corresponding value is valid, and there is no RU allocation for AID12=0 (OFDMA random access) from the current trigger frame to the end of an SP (TWT SP or TXOP).

Figure 20:
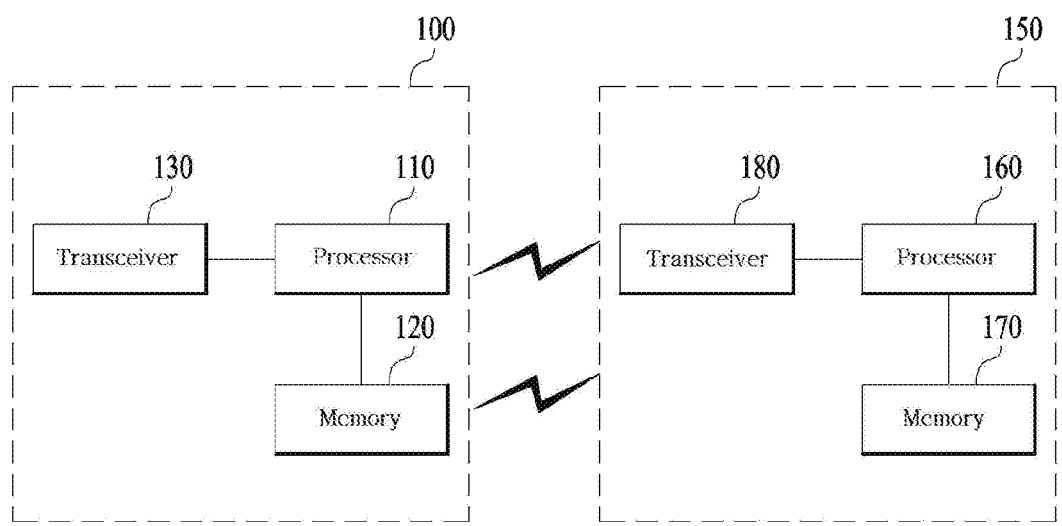
FIG. 20 is a block diagram illustrating exemplary configurations of an AP apparatus (or a BS apparatus) and an STA apparatus (or a UE apparatus) according to an embodiment of the present invention.

FIG. 20 is a block diagram for exemplary configurations of an AP (or base station) and an STA (or user equipment) according to one embodiment of the present invention.

An AP 100 may include a processor 110, a memory 120, and a transceiver 130, and an STA 150 may include a processor 160, a memory 170, and a transceiver 180.

The transceiver 130/180 can transmit/receive a radio signal, and the physical layers according to the IEEE 802 system can be implemented therein. The processor 110/160 is connected to the transceiver 130/180, and physical layers and/or MAC layers according to the IEEE 802 system can be implemented therein. The processor 110/160 is configured to operate according to at least one of the various embodiments of the present invention. A module for implementing operations of the AP and STA according to the various embodiments of the present invention may be stored in the memory 120/170, and the module can be controlled by the processor 110/160. The memory 120/170 can be connected to the processor 110/160 by well-known means such that the memory 120/170 is included in the processor 110/160 or installed outside the processor 110/160.

The details of the AP 100 and STA 150 can be respectively applied to a base station and a user equipment in other wireless communication systems (e.g., LTE/LTE-A system).

The above-described configurations of the AP and STA may be applied such that the above-described embodiments can be independently implemented or two or more thereof can be simultaneously implemented. For clarity, redundant description will be omitted.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims.

Accordingly, the invention should not be limited to the embodiments described herein, but should be accorded the broadest scope consistent with the principles and novel features disclosed herein. It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, this document describes both the product invention and method invention, and if necessary, the two inventions can be complementarily interpreted.

INDUSTRIAL APPLICABILITY

The aforementioned embodiments of the present invention can be applied to various wireless communication system including the IEEE 802.11 system.

What is claimed is:

1. A method of reducing power consumption by a station (STA) in a wireless local area (WLAN) system, the method comprising:
   receiving, from an access point (AP), a trigger frame including a common information field and a user information field, the user information field indicating different information when an association identifier (AID) subfield of the user information field is set to a first value indicating resource allocation for random access, and when the AID subfield of the user information field is set to a value other than the first value; and
   transmitting a physical protocol data unit (PPDU) to the AP in response to the trigger frame,
   wherein if the AID subfield is set to the first value, the user information field includes information indicating whether resources are allocated for random access, and the STA transitions to a doze state on the basis of the information indicating whether resources are allocated for random access.

2. The method according to claim 1, wherein if the AID subfield is set to a value other than the first value, the user information field includes a spatial stream (SS) allocation subfield indicating information about an SS of the PPDU transmitted in response to the trigger frame, a modulation and coding scheme (MCS) subfield indicating an MCS to be applied to the PPDU, and a target received signal strength indicator (RSSI) subfield indicating a target RSSI for the PPDU.

3. The method according to claim 2, wherein if the AID subfield is set to the first value, the user information field includes a subfield indicating the information indicating whether resources are allocated for random access in a position corresponding to the SS allocation subfield, the MCS subfield, and the target RSSI subfield.

4. The method according to claim 1, wherein if the STA is performing random access, and the information indicating whether resources are allocated for random access is set to a first value, the STA transitions to and maintains the doze state for a predetermined time period.

5. The method according to claim 4, wherein the predetermined time period is configured as one of a scheduling period based on the trigger frame, a target wake time (TWT) service period from the trigger frame, and a period from the trigger frame to the end of a transmission opportunity (TXOP).

6. The method according to claim 2, wherein if the STA transmits uplink data in a multi-user scheme, and the AID subfield is set to a value other than the first value, the STA transmits a trigger-based PPDU (TB PPDU) to the AP on the basis of information of the user information field.

7. The method according to claim 1, wherein the first value is 0 or 2045.

8. A station (STA) configured to reduce power consumption in a wireless local area (WLAN) system, the STA comprising:
   a transceiver configured to receive, from an access point (AP), a trigger frame including a common information field and a user information field, and transmit a physical protocol data unit (PPDU) to the AP in response to the trigger frame; and
   a processor configured to control the transceiver to transmit the PPDU by processing the trigger frame,
   wherein when an association identifier (AID) subfield of the user information field is set to a first value indicating resource allocation for random access, and when the AID subfield of the user information field is set to a value other than the first value, the user information field indicates different information, and
   wherein if the AID subfield is set to the first value, the user information field includes information indicating whether resources are allocated for random access, and the processor transitions the STA to a doze state on the basis of the information indicating whether resources are allocated for random access.

9. The STA according to claim 8, wherein if the AID subfield is set to a value other than the first value, the user information field includes a spatial stream (SS) allocation subfield indicating information about an SS of the PPDU transmitted in response to the trigger frame, a modulation and coding scheme (MCS) subfield indicating an MCS to be applied to the PPDU, and a target received signal strength indicator (RSSI) subfield indicating a target RSSI for the PPDU.

10. The STA according to claim 9, wherein if the AID subfield is set to the first value, the user information field includes a subfield indicating the information indicating whether resources are allocated for random access in a position corresponding to the SS allocation subfield, the MCS subfield, and the target RSSI subfield.

11. The STA according to claim 8, wherein if the STA is performing random access, and the information indicating whether resources are allocated for random access is set to a first value, the processor is configured to control the STA to transition to and maintain the doze state for a predetermined time period.

12. The STA according to claim 11, wherein the predetermined time period is configured as one of a scheduling period based on the trigger frame, a target wake time (TWT) service period from the trigger frame, and a period from the trigger frame to the end of a transmission opportunity (TXOP).

13. The STA according to claim 9, wherein if the STA transmits uplink data in a multi-user scheme, and the AID subfield is set to a value other than the first value, the processor is configured to transmit a trigger-based PPDU (TB PPDU) to the AP on the basis of information of the user information field through the transceiver.

14. A method of reducing power consumption of a station (STA) in a wireless local area (WLAN) system, the method comprising:

transmitting a trigger frame including a common information field and a user information field to one or more STAs by an access point (AP), the user information field indicating different information when an association identifier (AID) subfield of the user information field is set to a first value indicating resource allocation for random access, and when the AID subfield of the user information field is set to a value other than the first value; and receiving a physical protocol data unit (PPDU) from the one or more STAs in response to the trigger frame, wherein if the AID subfield is set to the first value, the user information field includes information indicating whether resources are allocated for random access, whereby allowing the one or more STAs to transition to a doze state on the basis of the information indicating whether resources are allocated for random access.

15. An access point (AP) for reducing power consumption of a station (STA) in a wireless local area (WLAN) system, the AP comprising:

a transceiver configured to transmit a trigger frame including a common information field and a user information field to one or more STAs, and receive a physical protocol data unit (PPDU) from the one or more STAs in response to the trigger frame; and a processor connected to the transceiver and configured to provide the trigger frame, wherein when an association identifier (AID) subfield of the user information field is set to a first value indicating resource allocation for random access, and when the AID subfield of the user information field is set to a value other than the first value, the processor is configured to configure the user information field to indicate different information, and wherein if the AID subfield is set to the first value, the user information field includes information indicating whether resources are allocated for random access, whereby allowing the one or more STAs to transition to a doze state on the basis of the information indicating whether resources are allocated for random access.

\* \* \* \* \*